United States Patent
Oga et al.

(10) Patent No.: US 6,895,463 B2
(45) Date of Patent: May 17, 2005

(54) METHOD AND APPARATUS FOR EFFICIENTLY RUNNING AN EXECUTION IMAGE USING VOLATILE AND NON-VOLATILE MEMORY

(75) Inventors: Eiji Oga, San Diego, CA (US); Kazuhiro Miyoshi, San Diego, CA (US); Park Uh, San Diego, CA (US)

(73) Assignee: Pioneer Digital Technologies, Inc., San Diego, CA (US)

( * ) Notice: Subject to any disclaimer, the term of this patent is extended or adjusted under 35 U.S.C. 154(b) by 127 days.

(21) Appl. No.: 10/063,558

(22) Filed: May 2, 2002

(65) Prior Publication Data

US 2003/0093653 A1 May 15, 2003

Related U.S. Application Data (60) Provisional application No. 60/340,617, filed on Oct. 30, 2001.

(51) Int. Cl.[7] ............................................. G06F 12/00
(52) U.S. Cl. ...................... 711/103; 711/100; 711/105; 711/154
(58) Field of Search ................................ 711/100, 103, 711/105, 154, 147; 707/1, 204; 710/68; 717/11

(56) References Cited

U.S. PATENT DOCUMENTS

| | | |
|---|---|---|
| 5,754,863 A | 5/1998 | Reuter |
| 5,859,982 A | 1/1999 | Lindholm |
| 5,940,072 A | 8/1999 | Jahanghir et al. |
| 6,052,803 A | 4/2000 | Bhatia et al. |
| 6,108,727 A * | 8/2000 | Boals et al. .................. 710/68 |
| 6,131,192 A | 10/2000 | Henry |
| 6,134,631 A | 10/2000 | Jennings, III |
| 6,192,447 B1 | 2/2001 | Shand |
| 6,192,454 B1 | 2/2001 | De Vos |
| 6,195,743 B1 | 2/2001 | Elnozahy |
| 6,209,070 B1 | 3/2001 | Reed et al. |
| 6,256,714 B1 | 7/2001 | Sampsell et al. |
| 6,259,442 B1 | 7/2001 | Britt, Jr. et al. |
| 6,275,921 B1 | 8/2001 | Iwata et al. |
| 6,279,153 B1 * | 8/2001 | Bi et al. ..................... 717/171 |
| 6,292,847 B1 | 9/2001 | Nishimoto et al. |
| 6,564,070 B1 * | 5/2003 | Nagamine et al. ....... 455/556.1 |
| 2002/0116575 A1 * | 8/2002 | Toyomura et al. .......... 711/115 |

FOREIGN PATENT DOCUMENTS

EP     1107567     6/2001

* cited by examiner

Primary Examiner—Tuan V. Thai
(74) Attorney, Agent, or Firm—Keiji Masaki; Steve A. Wong; Micah P. Golfamit (57) ABSTRACT

The present invention provides an apparatus and method for efficiently running an execution image containing instructions for running a computer program in a set-top box. A non-volatile memory stores a compressed version of the execution image. A volatile memory is configured to execute the execution image. A computing unit transfers and decompresses the compressed version of the execution image from the non-volatile memory to the volatile memory where the execution image in non-compressed form can be executed efficiently.

6 Claims, 4 Drawing Sheets

METHOD AND APPARATUS FOR EFFICIENTLY RUNNING AN EXECUTION IMAGE USING VOLATILE AND NON-VOLATILE MEMORY

CROSS REFERENCE TO RELATED APPLICATIONS

This patent application claims priority under 35 U.S.C. §119(e) to U.S. Provisional Patent Application Ser. No. 60/340,617, filed Oct. 30, 2001, for METHOD AND APPARATUS FOR EFFICIENTLY RUNNING AN EXECUTION IMAGE USING VOLATILE AND NON-VOLATILE MEMORY, the entirety of which is hereby incorporated by reference.

BACKGROUND OF INVENTION

The present invention generally relates to a computer system and methods for efficiently executing computer programs.

A set-top box is a device that enables a television set to become a user interface capable of receiving and decoding digital television broadcasts via phone, cable, the Internet, or other means of communication. Set-top boxes are sometimes called receivers. As set-top box technology matures and new features are added, the size of the execution image of the computer program grows and consequently the demand for memory also grows. The modern set-top box requires memory in order to store computer programs and other information related to the applications implemented by the set-top box. As the size of the execution image grows, the programming time takes longer, including the physical programming time for the non-volatile memory and delivery time for the execution image through broadband networks in the case when the set-top box allows remote programming of the execution image. In view of the foregoing growth in required memory size, it would be desirable to provide one or more techniques which provide for memory storage in set-top boxes capable of handling the growing size of execution images which are cost-effective and efficient.

SUMMARY OF INVENTION

In order to achieve the above-mentioned objectives, the present invention provides an apparatus and method for efficiently running an execution image containing instructions for running a computer program. A non-volatile memory stores a compressed version of the execution image. A volatile memory is configured to execute the execution image. A computing unit transfers and decompresses the compressed version of the execution image from the non-volatile memory to the volatile memory where the execution image in non-compressed form can be executed efficiently.

BRIEF DESCRIPTION OF DRAWINGS

In order to facilitate a fuller understanding of the present invention, reference is now made to the appended drawings. These drawings should not be construed as limiting the present invention, but are intended to be exemplary only.

DETAILED DESCRIPTION

Figure 1:
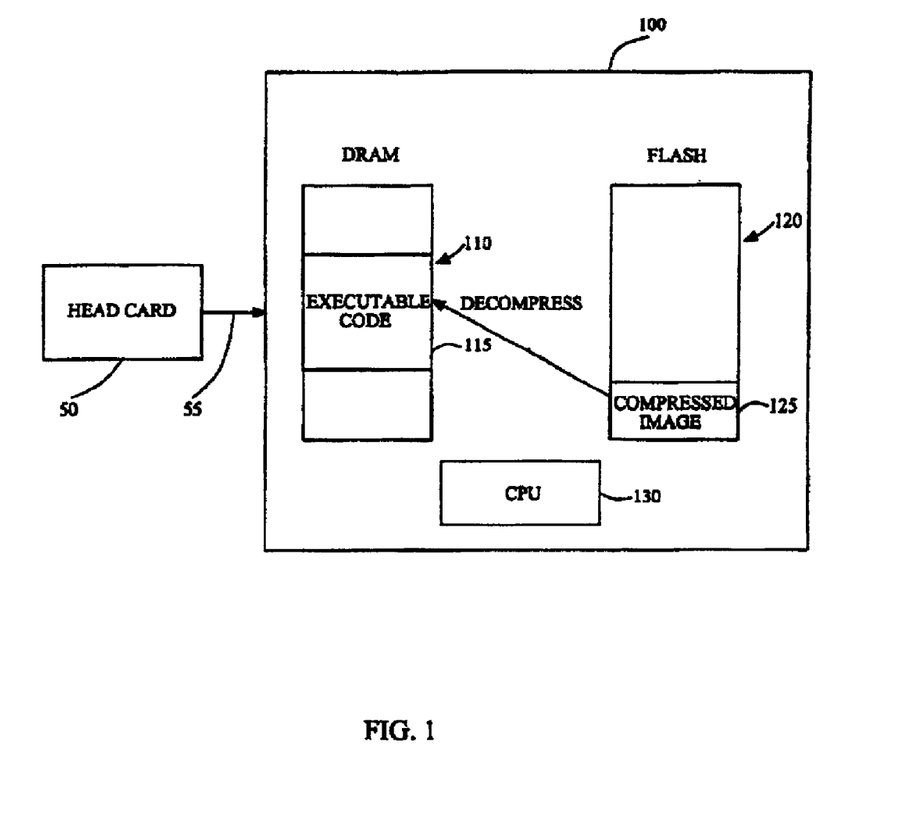
FIG. 1 shows a computer system for executing code according to the present invention.

The present invention is directed to set-top box technology. The invention allows computer code (an execution image) to be executed faster and more efficiently in a set-top box. In FIG. 1 is shown a computer system 100 (e.g., a set-top box) of the present invention which comprises a volatile memory 110 such as dynamic random access memory (DRAM) and a non-volatile memory 120 such as a Flash read-only memory (FlashROM). The non-volatile memory 120 retains its information even when there is no power (such as in a hard disk). The volatile memory 110 must have power to work but has the advantage of being cheaper than the FlashROM and executing more rapidly. The non-volatile memory 120 has a small memory size in comparison to the volatile memory 110. The computer system 100 is configured to receive an executable image containing computer code, for example the compressed image 125 from a remote source 50 over a transmission medium 55. The transmission medium 55 may be a broadband network, a cable system, the Internet, or any other communication system capable of transmitting digital data.

The present invention allows a compressed version of the execution image 125 to be stored in the non-volatile memory 120. Compression reduces the size of the execution image allowing it to be stored in a smaller space. Additionally, the compressed image 125 could be more rapidly transmitted over the transmission medium 55. When it is time to execute the computer program, the execution image 125 is transferred and decompressed (on the fly) into its executable code 115 which is stored in a portion 115 of the volatile memory 11 0. The volatile memory 110 can hold the larger decompressed version of the execution image and can execute it more rapidly. The computing unit (e.g., a CPU) 130 contains a bootloader program which is further described in SECTION A. The bootloader program resident in the CPU 130 is responsible for initializing the set-top box and carrying out the decompression sequence described herein.

Figure 2:
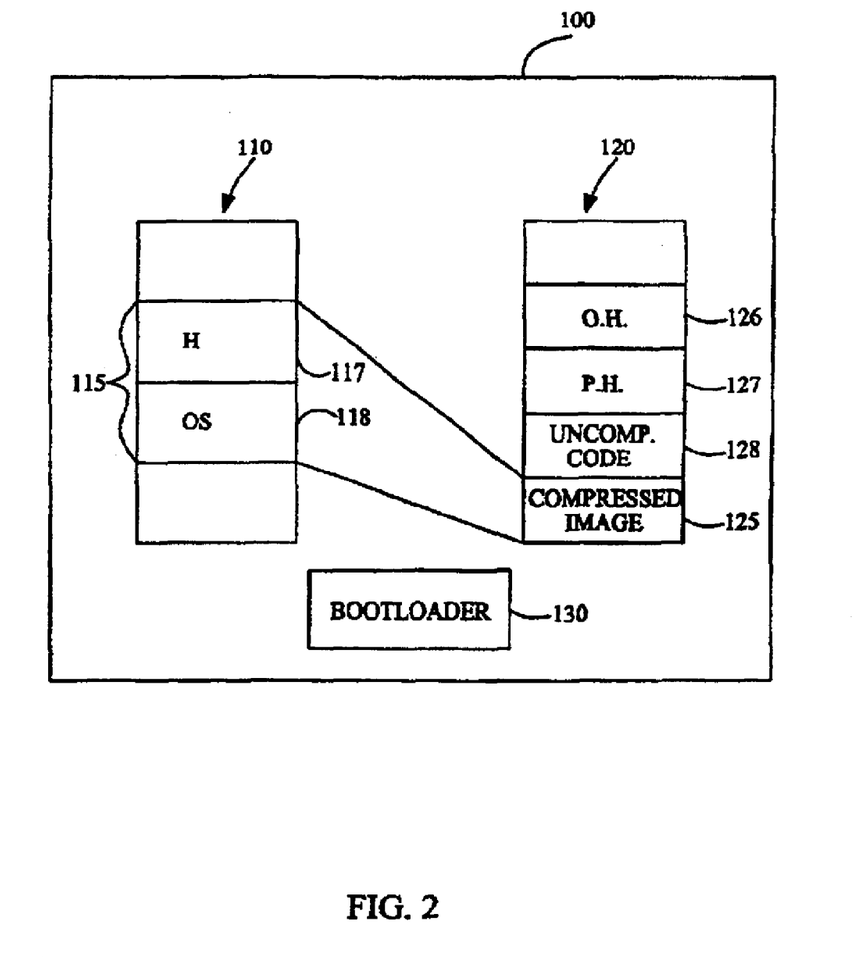
FIG. 2 shows a computer system for executing code with a bootloader according to the present invention.
Figure 3:
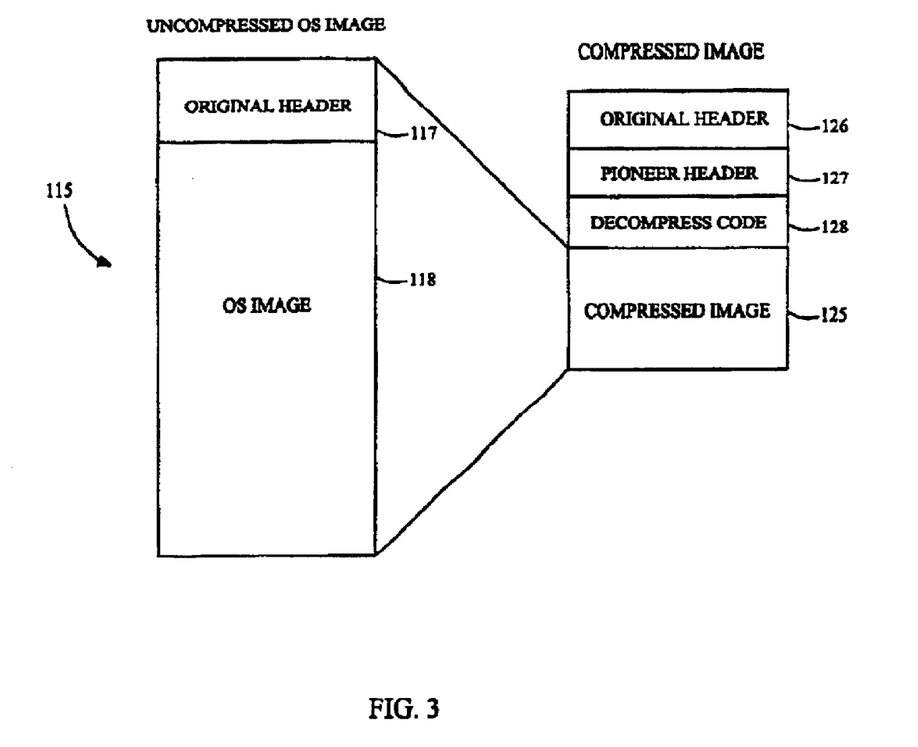
FIG. 3 shows a memory map according to the present invention.

FIG. 2 shows more details of the computer system 100 set out in FIG. 1. FIG. 3 shows the details of the memory images for the volatile memory 110 and the non-volatile memory 120. The memory space of the non-volatile memory 120 comprises an original header (O.H.) 126, a Pioneer header (P.H.) 127, uncompressed code 128, and a compressed image 125. The compressed image 125 when transferred to the volatile memory 110 expands into the uncompressed execution code 115 comprising a header 117 and an operation system along with applications 118. The code 128 comprises (in uncompressed format) the decompression algorithm used to decompress the compression image 125. This is advantageous because the decompression algorithm of the compressed code 128 may thus be changed without changing the software of the computer system 100. Another advantage is that the decompression algorithm may be updated and downloaded from a central location as needed without changing the software of each individual set-top box thus facilitating maintenance.

Figure 4:
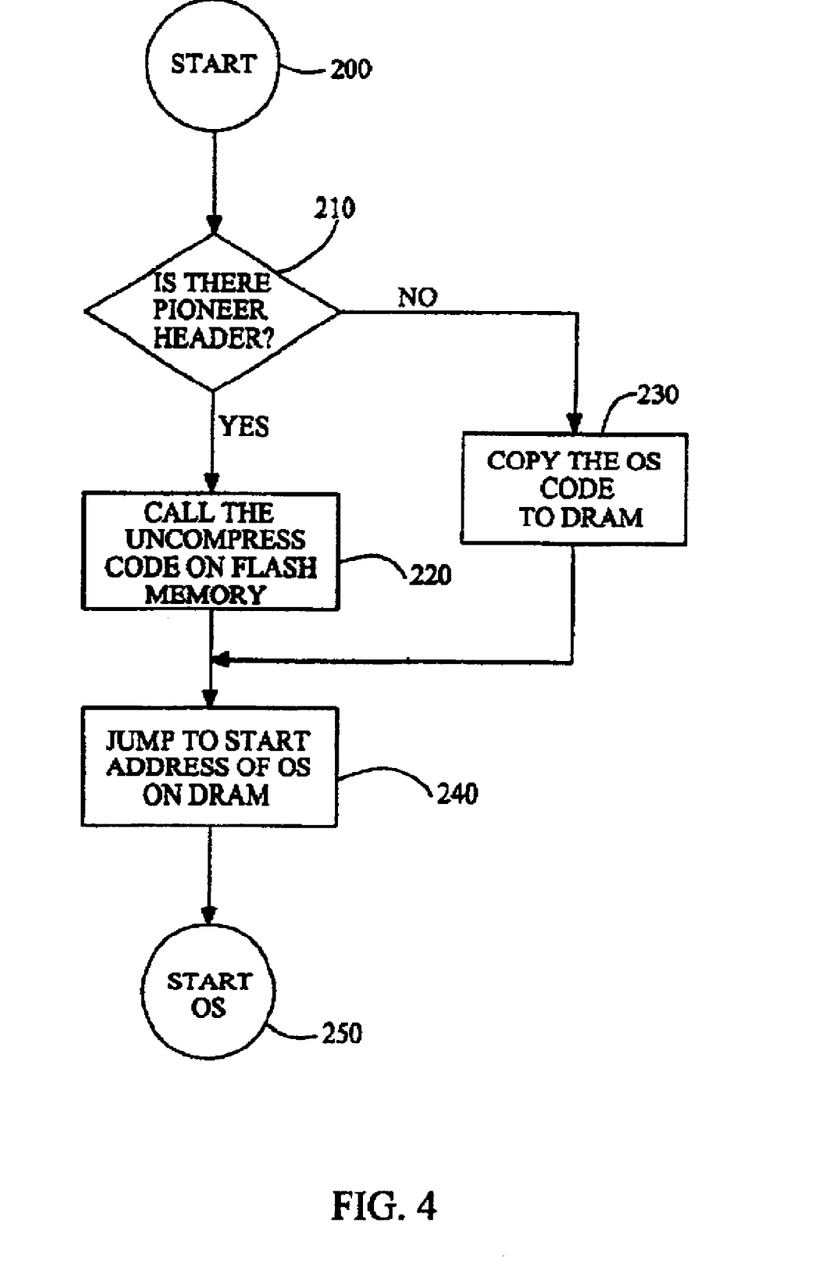
FIG. 4 shows a method of decompression according to the present invention.

FIG. 4 shows the decompression process according to the present invention. This decompression process allows the executable image to be executed either in the non-volatile memory 120 or the volatile memory 110 after copying the execution image from the non-volatile memory 120. In step 200, the executable image 125 in compressed form is initially found stored in the non-volatile memory 120. In step 210, the bootloader checks the code for the pioneer header 127. If there is no pioneer header then in step 230 the executable image 125 is copied on the fly to the volatile memory 110. If there is a pioneer header, then at step 220 the code is called and subsequently executed from the non-volatile memory 120. In step 240, the bootloader 120 jumps to the start address of the operating system on the volatile memory 110. The decompression algorithm 128 is configured to decompress the compression code in pieces. In other words, the decompression algorithm (1) decompresses a piece of the operating system (OS) image and puts this piece in the volatile memory and (2) continues with step (1) until it finishes extracting the whole OS image. In step 250, the bootloader starts the operating system.

The foregoing description is believed to adequately describe the overall concepts, system implementation and operation of the various aspects of the invention in sufficient detail to enable one of ordinary skill in the art to make and practice the invention with all of its attendant features, objects and advantages. However, in order to facilitate a further more detailed in depth understanding of the inventions and additional details in connection with even more specific, commercial implementations of various embodiments of the invention, the following further description and explanation is given.

The following is a more detailed description of the bootloader program. Again, for purposes of organization, clarity and convenience of explanation, the additional disclosure is set forth in the following section.

Section A: Bootloader Program The following is a detailed description of the bootloader program. Bootloader for BD Kaz Miyoshi Park Uh Target CPUBROADCOM BCM7100

Bootloader Product Number:Z03 01 00 0004 01 Version:0.60.071 References Author Document SA DHCT code download operation and data structure ver. 1.10

PowerTVPlatform HAL API ver. 1.0a[2]

PowerTVPowerTV Hardware Abstraction Layer API Reference ver 2. 0a2.4.

PowerTVConnection Your Set top to an SA Network ver. 1.0Draft EIA/CEAPioneerNVM map.xls PioneerFlashROM Driver.doc 2 Conventions Used in This DocumentThe following conventions are used: italic Represents file and directory names, function names, program variables, names of documents and of chapters in this document, and general emphasis. Bold Represents command names, options, and front panel keys. Constant Width Represents programming language keywords such as int and struct. In examples, it is used to show program code, input or output files, and the output from commands and program runs. Constant Width Bold Used in examples to show commands or input that you enter at the terminal. Constant Width ItalicUsed in examples to show generic (variable) portions of a command that you should replace with specific words appropriate to your situation. For examples:>log set All info means to type the command log, followed by the name of a file.

3 Boot Process at a GlanceThe very initial system startis one of main tasks of the Bootloader. The section summarizes the boot process, in 3.1 Board InitializationAfter application of power to the box, the Bootloader first takes control of the BD-V3 0 0 0 system. It then does minimal hardware initialization, such as: CPU (and its related, minimal peripheral controller) SDRAM controller System caches This is also the stage at which all the LED segments are lit for 750 milliseconds. This very first step is achieved by careful Assembly coding because no memory is yet available at this stage.

3.2 Primitive Software InitializationOnce those initialization done, the Bootloader proceeds to the next stage, at which it does software initialization in order to properly starta highsoftware language such as C Language. This is also the stage at which the Bootloader loads itself from FlashROM to SDRAM and executes the code out of SDRAM. The Bootloader was originally designed to run on the FlashROM, but we observed an occasional MPEGPS sections lost during our Bootloader test at PowerTV office. The problem persisted, except for running the Bootloader on SDRA.M. Running the Bootloader on SDRA.M surely speeds up its Execution, while the only drawback would be some extra space on SDRAM which the Bootloader runs. The cause of this problem is yet undetermined.

3.3 OS Level Software InitializationWhen the Bootloader reaches here, it then initiates the system software (a kind of OS) initialization. It prepares multienvironment and finally passes control to the Root thread, which is also the Main thread of this Bootloader.

3.4 Main Thread startedAt the beginning of the Main thread. it calls HALdrivers' initialization methods and has them ready for use. Now, the Bootloader is full functional and ready to start whatever it has to do. The first practical task of the Bootloader is to launch the Menu Console (see Chapter 5 Menu Console) only if asked by users. Pressing the MENU Button on the front panel will trigger this Menu Console and print the greeting message and a list of menu items to the console via a serial port. The Menu Console allows users to download the OS image and the Bootloader itself via the very same serial port, control log message output, and so forth in an interactive way. When users exit from the Menu Console, or else the Menu Console is just not activated, the Bootloader continues to its subsequent procedure. The Bootloader then checks to see if any valid OS exists in the FlashROM, and if it is evaluated to good, loads it into SDRAM and execute it unless the OS is disabled by of the system parameter stored in NVM or a download request made by the OS is left pending.

To be precise, the Bootloader performs this process in the following manner.

1.The Bootloader checks to see if a valid OS is installed in FlashROM. If it finds a valid OS, it continues to the next step [2].

If it doesn't, it initiates a download process on its own volition and tries to download whatever available OS for our boxes [6].

2.Next, the Bootloader checks the OS Boot Enabled Flag stored in NVM. If it finds the flag disabled, it initiates a download process [6], otherwise continues to the next step [3].

3.Next, the Bootloader checks to see if there is a download request made by user, and if there is, it initiates a download process and tries to download a newer version of OS (see Chapter 4.2 Updates upon user request (case c.)). If there isn't, the Bootloader continues to the next step [4].

4.Then, the Bootloader checks to see if there is any pending download request previously made by the OS installed in the FlashROM. If there is one, the Bootloader initiates a download process based on the information given by the request [6], otherwise continues to the next step [5].

5.This is the stage at which the Bootloader loads the OS into SDRAM and execute it. The OS in FlashROM may or may not be compressed (see Chapter 9 Compressed OS download). If it is, the self OS image will automatically inflate. At the end of loading the Bootloader evaluates CRC to see if loading was successfully done and executes the OS unless the CRC is bad. If this is the case the Bootloader initiates a download process [6].

6.At this stage, the Bootloader attempts to download an available OS via RF data channel. This attempt continues until it completes. The Bootloader will reboot the system on completion of the download (see Chapter 4 Download Scenario for details of download procedure).

4 Download ScenarioIn field, OS download takes place in the following causes. a.When the Bootloader can't find a valid OS in FlashROM on application of power to the box. b.When OS Boot Enabled Flag is set to disabled. c.When user asks for a download. d.When the OS issues a download request to the Bootloader on runThe following chapter explains each download action corresponding to each cause listed above.

4.1 Selfdownload (case a. and b.)Under these conditions, the Bootloader consider that there's no valid OS to start in FlashROM. Hence, it initiates a download process of its own volition and takes whatever available version of OS for our boxes at that time. It hunts for the frequencies until it gets a CVT (see DHCT code download operation and data structure ver.1.10 as regards its format in detail) out of MPEG private section. Once it gets a CVT and finds a matched record to our particular type of box in the CVT, then it in turn initiates DSMdownload based on the specific information given by the CVT record. This process continues until the download completes. On completion of download, the Bootloader burns the downloaded image into FlashROM and reboots the system.

4.2 Updates upon user request (case c.)This specific download is initiated by users (such as service operators) and triggered off by pressing the front panel VOLkey down upon application of power to the box and held pressed until the front panel LED displays hnnn to indicate the hunt for the frequencies has initiated. However, this procedure does NOT forcibly update the OS image, but it does if and only if any newer version of OS is available for our boxes (to be precise, any different version than the current one you box has). The Bootloader keeps searching for the newer OS until it finds a new version of OS and then completes a download or else next power cycle.

4.3 Updates upon OS request (case d.)This is the download that should normally take place in field. In this scenario, the OS is in charge of obtaining CVT through either MPEG private section or QPSK Pass Through Message and passing it to the Bootloader because needless to say, the Bootloader is not running once it launches the OS. Since the OS has no intelligence to interpret CVT, it passes CVT to the Bootloader through HAL/bldr interface in order to query availability of newer versions. On the other hand the Bootloader basically has no right to initiate a download even if a newer version of OS is available. It notifies the OS of the availability of download and leaves the OS when to initiate a download unless CVT designates either Emergency download or forced dowvnload. If this is the case the Bootloader will start an immediate emergency download without OS interaction. In either case where a download is needed a download request is once saved into NVM and resets and reboots the system into the Bootloader. On the next run of the Bootloader, the request saved in NVM contains a frequency number at which the OS image is broadcasted. Thus, the Bootloader does not need to hunt around the frequencies to get the initial download information. i.e.. a CVT record, rather directly tunes to the specified channel and initiates DSMdownload immediately. This process continues until this specific download request completes. On completion of download, the Bootloader burns the downloaded image into FlashROM and reboots the system.

5 Menu ConsoleThe Menu Console was designed to facilitate the manufacturing, the field service, or else troubleshooting. The Menu Console prints to a DTE (Data Terminal Equipment, or terminal), such as HyperTerminal, via serial communication. Use a DTE(straightcable to connect a box with a terminal.

5.1 Terminal ConfigurationIn order for the Bootloader to communicate properly with the terminal, the following configuration is required for the terminal. ParametersValuesBaud rate115200[bps]Data bits8ParityNoneStop bits1Flow controlNone 5.2 Menu Console Invocation and Password Authentication. The Menu Console is invoked when the front panel MENNU key is pressed down upon application of power to the box and held pressed down until the front panel LED starts displaying—and—by turns, which lasts for ten seconds and during which the Bootloader is waiting for user password to be provided from a terminal. Note that neither prompt nor any navigation message appears in the terminal until you supply a good password. This is to avoid possible troubles in filed, where IRmay be connected to the serial port. Now, you must enter either Public Password or Unique Password to activate the MenuConsole. If you don't supply any good password before timeout, the Bootloader returns to the normal boot sequence. When you enter the Public Password, you will see the following Standard Menu display at the terminal screen.

Voyager3 Bootloader Menu Console

P/N:Z03 01 00 0004 01

Ver:0.60.05, built: 18:03:57, Mar. 13, 2001

Select item below and hit return

Menu Console

Select a number below

1: PowerTV OS download

2: PowerTV OS download w/forced FLASHROM programming

3: Bootloader Update

4: Disable CS boot

5: Set Download Carrier

6: Boot From FlashROM

7: Exit Menu Console

If you enter the Unique Password, you will see an extra menu item 8: Expert Menu in addition to the Standard Menu items.

Voyager3 Bootloader Menu Console

P/N: Z03 01 00 0004 01

Ver: 0.60.05, built: 18:03:57, Mar. 13, 2001

Select Item below and hit return

Menu Console

Select a number below

1: PowerTV OS download

2: PowerTV OS download w/forced FLASHROM programming

3: Bootloader Update

4: Disable CS boot

5: Set Download Carrier

6: Boot From FlashROM

7: Exit Menu Console

8: Expert Menu

The next section explains each menu item in detail 5.3 Standard Menu functions 5.3.1 1: PowerTV OS downloadWhile the Bootloader is designed to download the OS image via inchannel, it is also capable of downloading via serial line. Nevertheless it takes several minutes to download the big OS image, the serial download comes in handy because no special equipment other than a terminal is required. The terminal must be capable of 1K-Xmodem protocol to send a file, but most of the recent terminals should be OK.When you select the function 1 at the Menu Console, the following message appears and indicates that the Bootloader is waiting for the OS image to be transferred via the very same communication port. You can now send the image using 1K-Xmodem protocol. Note that you have no control of the terminal once file transfer is initiated although canceling file transfer or any other errors during the download procedure will return control to you. >1Download via Seral, use (1K) Xmodem protocolHit ESC to cancel download anytimeCCCThe OS image sent through this function has a special format and is called SBL file (see Appendix A. Terminologies).During this specific function, the Bootloader accepts the OS image only addressed to either FlashROM: Ox 1 f080000 or DRAM: 0x00080000 (Both addresses described in physical address. See Chapter 10 Memory Map), which information is given by the SBL header (see Appendix C. The Data Structure for Serial Download). On completion of the file transfer, the Bootloader programs the image into FlashROM and reboots the box if the image address designates FlashROM. If the image address designates DRAM, the Bootloader simply execute the image that has just been downloaded.

5.3.2 2: PowerTV OS download w/forced FLASHROM programmingThis is one of old functions and may be removed in the future. Its function is analogous to PowerTV OS download described above except that it always programs the OS image even if DRAM address is specified in the SBL header. While this function seems redundant, it may be useful because we don't need prepare separate files for download into DRAM and FlashROM respectively.

5.3.3 3: Bootloader UpdateThis function serves literally to update the Bootloader. On completion of the file transfer, the Bootloader always programs FlashROM in order to update itself with newer version. The box will reboot when FlashROM programming completes. No content in FlashROM except for the Bootloader image should be changed by this function. Warning: Do NOT unplug the power cable while FlashROM . programming is taking place, especially for the Bootloader update. Such disturbance will cause FlashROM programming failure and then the system will be no longer operational. There's no remedy to fix this problem once it happens.

5.3.4 4: Enable OS bootThis function is mainly used at the manufacturing stage, where each box is shipped with OS boot disabled. In terms of the Bootloader, disabling OS boot is analogous to erasing the OS image that resides in FlashROM. Thus, if this flag is set disabled, the Bootloader will attempt to download whatever the OS image that is available via RF cable. The Bootloader will set this flag enabled whenever it completes an OS image download so that the OS will start up from then on. There's no chance for the Bootloader to set this flag disabled. It is done only through this function.

5.3.5 5: Set Download CarrierThis function allows you to specify the first digital frequency and its type of modulation from which the Bootloader will start the hunt for the frequencies. The Bootloaderwill start the hunt from #80/QAM64 by default (see Appendix D for details of the hunt algorithm.)

>5

Type: frequency (in Hz) [1(QAM256) I O(QAM64)]

FREQ>615000000 0

5.3.6 6: Boot From FlashROM When you select this function, the box simply reboots.

5.3.7 7: Exit Menu Console When you select this function, the Menu Console ends and the Bootloader continues its operation.

5.4. Expert Menu functions:

5.4.1 8: Expert MenuWhen you select this function, the following sub menu will appear. Some of these functions are designed solely for software debugging purpose and may be removed in the future.

Expert Menu Select a number below

1: RF MAC address programming

2: Ethernet MAC address programming

3: Serial Number programming

4: Phal Download

5: Command Shell

6: NVM Test

7: FlashROM Test

8: Tuner Test

9: Mpegps Test

10: Exit this Sub Menu, 5.4.2 1: RF MAC address programming This function allows you to set a RF MAC Address that is saved in NVM located on the motherboard. When the Bootloader programs a new RF MAC Address, it also updates CRC of the RF MAC Address, the secondary RF MAC Address, and CRC of the Pioneer Hardware Parameter Block (see Chapter 10.3 NVM.)Current RF MAC Address 00:e0:36:01:23:45 Hit return to proceed "q" to exitMACPROG>00:e0:36:29:b5:72New RF MAC Address 00:e0:36:29:b5:?2Hit return to proceed "q" to exit(I) MAC programming successfully completed 5.4.3 2: Ethernet MAC address programming This function allows you to set an Ethernet MAC Address that is saved in NVM located on the daughter card.

5.4.4 3: Serial Number programming Current S/N: PMUKFF000Hit return to proceed "q" to exitSNPROG>PMUKFF0E3 New S/N: PMUKFF0E3Hit return to proceed to exit(I) Serial Number programming successfully completed 5.4.5 4: Phal Download

TEXT 5.4.6 5: Command Shell

TEXT 5.4.7 6: NVM Test

TEXT 5.4.7 7: FlashROM Test

TEXT 5.4.8 8: Tuner Test

TEXT 5.4.10 9: Mpegps Test

TEXT 5.4.11 10: Exit this sum Menu

TEXT

5.5 Implicit Menus

TEXT

5.5.1 RF MAC Address Correction

When the Bootloader finds both the Primary RF MAC Address and the Secondary RF MACAddress are corrupted due to bad CRC, you will see EP02 display on the front panel LED, under which the Bootloader halts its normal operation. To remedy this condition, there's a menu that is activated by pressing MENU key on the front panel (no power cycling required), which should display the following message on your terminal. It dumps the content of NVM for the survey in the first place. Next comes a minimal menu that only allows you to reprogram a new RF MAC Address. IMPORTANT: You should be ready to save this log for further investigation.

5.5.2 Serial Number Correction

When the Bootloader finds the Hardware Serial Number is corrupted due to bad checksum, you will see EP03 display on the front panel LED, under which the Bootloader halts its normal operation. To remedy this condition, there's a menu that is activated by pressing MENU key on the front panel (no power cycling required), which should display the following message on your terminal. It dumps the content of NVM for the survey in the first place. Next comes a minimal menu that only allows you to reprogram a new Serial Number. IMPORTANT: You should be ready to save this log for further investigation.

```
NVM Read/Write Test
cmd: dump in hex
offset: 0
len: 256
0000: 01 ff 0b b8  00 0a 50 4d 55 4b  46 46 30 45 33 ba
0x10: 00 01 ff ff  ff ff ff ff 00 e0  36 29 b5 72 67 00
0x20: ff ff ff ff  ff ff ff ff ff ff  ff ff ff ff ff ff
0x30: ff ff ff ff  09 14 1d ff ff ff  ff ff ff ff ff ff
0x40: ff ff ff ff  ff ff 19 ff 30 80  ff ff 10 00 00 00
0x50: 3a 82 01 ff  ff ff ff ff ff ff  ff ff ff ff ff ff
0x60: ff ff ff ff  ff ff ff ff ff ff  ff ff ff ff ff ff
0x70: ff ff ff ff  ff ff ff ff ff ff  ff ff ff ff ff ff
0x80: ff ff ff ff  ff ff ff ff ff ff  ff ff ff ff ff ff
0x90: ff ff ff ff  ff ff ff ff ff ff  ff ff ff ff ff ff
0xa0: ff ff ff ff  ff ff ff ff ff ff  ff ff ff ff ff ff
0xb0: ff ff ff ff  ff ff ff ff ff ff  ff ff ff ff ff ff
0xc0: ff ff ff ff  ff ff ff ff ff ff  ff ff ff ff ff ff
0xd0: ff ff ff ff  ff ff ff ff 05 01  bd 00 00 e0 36 29
0xe0: b5 72 67 00  00 00 04 fb 00 00  00 00 00 00 00 00
0xf0: 00 00 00 00  00 00 ff ff 00 00  ff ff 80 00 01 a5
******* Voyager3 Bootloader Menu Console *******
  Bldr version: 0.60.04-s, built: 11:18:19, Feb. 21, 2001
Select Item below and hit return
------- RF MAC address correction -------
Select a number below
1: RF MAC address programming
2: Boot Film FlashROM
>
```

```
NVM Read/Write Test
cmd: dump in hex
offset: 0
len: 256
0000: 01 ff 0b b8 00  0a 50 4d 55 4b 46 46  30 45 33 00
0x10: 00 01 ff ff ff  ff ff ff 00 e0 36 29  b5 72 67 50
0x20: ff ff ff ff ff  ff ff ff ff ff ff ff  ff ff ff ff
0x30: ff ff ff ff 09  14 1d ff ff ff ff ff  ff ff ff ff
0x40: ff ff ff ff ff  ff 19 ff 30 80 ff ff  10 00 00 00
0x50: 6b 06 01 ff ff  ff ff ff ff ff ff ff  ff ff ff ff
0x60: ff ff ff ff ff  ff ff ff ff ff ff ff  ff ff ff ff
0x70: ff ff ff ff ff  ff ff ff ff ff ff ff  ff ff ff ff
0x80: ff ff ff ff ff  ff ff ff ff ff ff ff  ff ff ff ff
0x90: ff ff ff ff ff  ff ff ff ff ff ff ff  ff ff ff ff
0xa0: ff ff ff ff ff  ff ff ff ff ff ff ff  ff ff ff ff
0xb0: ff ff ff ff ff  ff ff ff ff ff ff ff  ff ff ff ff
0xc0: ff ff ff ff ff  ff ff ff ff ff ff ff  ff ff ff ff
0xd0: ff ff ff ff ff  ff ff ff 05 01 bd 00  00 e0 36 29
0xe0: b5 72 67 50 00  00 04 fb 00 00 00 00  00 00 00 00
0xf0: 00 00 00 00 00  00 ff ff 00 00 ff ff  80 00 01 a5
```

6 Hardware Error detection 6.1.1 SDRAMTBD 6.1.2 FlashROM

The following, FlashROM devices are currently supported.

Intel

28F640J3A, 28F128J3A

ST (TBD)

M58LW064

7 LED Display 7.1 POWER LED

The POWER LED blinks every 400 milliseconds as keepindicator independently of any Bootloader status while the Bootloader is in control of the system. Note that it stop blinking, while the Bootloader is performing a critical operations.

7.2 Dot LED, Message and Bypass

During the hunt for the frequencies (see Appendix D), the front panel LED indicates the following status.

Message dot LED:

Off: QAM64 On: QAM256

Bypass dot LED:

Off: Standard QAM frequency On: HRC QAM frequency 7.3 7-Segment LED 7.3.1 Status of boot process LED Description Turn off Initial status 8888 All LED segments (including dots) are lit upon every application of power to the box They are by turns displayed every one second indicating the Bootoader is waiting for user to enter a password MENU Indicates the Menu Console is up and running Chck Indicates OS validation is going on Load Loading the PowerTV OS into memory hnnn Indicates the hunt for the frequencies is going on, nnn designates an EIA #channel Lock Indicates (almost instantly) the tuner has locked to a frequency dLnn Indicates the progress of the RF download progress in nn[%]

FEnn Indicates progress of erasing FlashROM sector(s) in nn[%]

FWnn Indicates the progress of programming FlashROM sectors in nn[%]

d0 Waiting for the Xmodem download via serial d1 Xmodem download initiated d2 Download data evaluated to good 7.3.2 Error Status LED Description EP00 Fatal errors not yet assigned specific numbers EP01 SDRAM R/W error EP02 RF MAC CRC error (in NVM) See Chapter 5.5.1 RF MAC Address Correction EP03 Serial number checksum error (in NVM) See Chapter 5.5.2 Serial Number Correction Exnn CPU exception number nn that is irrecoverable TBD Unsupported FlashROM device (E-Signature Error)

LED Description

E-01 Generic Serial download Error

E-02 Invalid length error: the length field in SBL header does not indicate a multiple of 4

E-03 Out of range error: the image does not fall into the proper memory space (The start address and the length information in SBL header is not correct)

E-04 Data length error: the total length of data actually received via xmodem download is less than the length specified in SBL header E-05 Checksum error: SBL header checksum invalid E-06 Maker not found error: Rominfo Block supposed to be following the SBL header does not contain the valid Marker BASEBOOT E-07 CRC Error: CRC in Rominfo Block does not match E-08 Start address error in SBL header E-09 FlashROM sectors" unlock error E-10 FlashROM sectors" lock error LED Description E-20 Generic Xmodem Error during serial download E-21 Xmodem download canceled errorLEDDescription E-30 FlashROM programming error (Bootloader update failure)

E-31 Generic FlashROM programming error

E-32 Bad address error: The given address is out of range

E-33 Bad sector number error: The given sector number is out of range

E-34 Bad device error: Low voltage detected

E-35 Time out error: Time out occurred during FlashROM programming

E-36 Protected error: The attempt to write or erase a FlashROM sector failed because the sector is protected E-37 Command sequence error: indicates potential FlashROM driver error E-38 Erase error: Erasing a sector failed, possible device error E-39 Write error: Writing into a sector failed, possible device error.

8 Platform HAL API Support

The Bootloader supports a set of functions as known as PHAL API which is utilized by PowerTV OS on run(see Platform HAL.API ver. 1.0a2 for details). PowerTV OS accesses those functions through a table of pointers to functions which structure is called Phal SimpleDownLoadAPIpointers. An instance of this structure is placed at VMA:0x80000800, and that address information is notified to PowerTV OS on run (Hence, it does not matter where to locate the structure.) In addition to PHAL API, we have Pioneer proprietary API, which can be utilized by HAL drivers on runThe structure Bldr_Anchor is currently defined as follows and may be extended in the future.

Typedef struct Bldr_Anchor{

NvmdShdw pNvmdShdw;

Boolean (*getCvtRecord) (Stram_Buffer*pStrmBuf, CVT_INFO*pCvtInfo,Boolean blgnoreImageld,Boolean bCalledByOS);

ui16 (*getCrc16) (ui8*pData, ui32 length, ui16 crc);

i32 (*flshGetBlkNum) (ui32 addr);

ui32 (*flshGetBlkAddr) (i32 iBlkNum);

Boolean (*flshBlkLocked) (i32 iBlkNum);

i32 (*flshBlkLock) (i32 iBlkNum ,Boolean bLock);

i32 (*flshBlkErase) (i32 iBlkNum);

i32 (*flshWrite) (ui16*dst, ui16*src, ui32 hlen);
void (*flshSetWriteLED) (Boolean bEnable);
i32 (*flshGetWrite Progress) (void)Bldr_Callout) *callouts;
}Blfr_Anchor;

Where pNvmdShdw is a pointer to the Structure NvmdShdw. which is solely used by HAL/bldr driver and its description is beyond the scope of this document.

getCVTRecord is a pointer to a function, which is solely used by HAL/bldr driver and its description is beyond the scope of this document.

getcrc16 is a pointer to the function to calculate CRC16 described in Chapter 10.3 NVM. This function is available for the runimage and multithread-safe. pData is a pointer to an array of data to process. length is the number of data bytes to process. crc: is either previous return value of this function or 0xf f f f as initial value.

The members from flshGetBlkNum through flshGet-WriteProgress are all pointers to the FlashROM driver functions. They are available for the run-time image but NOT multithreadHence, care must be taken by the callers. See FlashROM Driver. doc for detailed description of those functions.

callouts is a pointer to the structure Bldr_Callout. The structure is designed to holds a list of pointers to callout functions that are once initialized to NULL by the Bootloader and then assigned values on runGiven a value, the Bootloader will execute it on a specific time accordingly. The structure is currently defined as follows and may be extended in the future.

typedef struct Bldr_Callout {
void(*resetco) (void);
}

Where, resetco is a pointer to the userfunction, which is called when the OScalls_phal_Reset ( ) to reset and reboot the system.

Warning: Any API (callable from the runimage) must be carefully designed so that it won't use any system calls of the Bootloader or standard library. As regards the standard library, it would be OK to use some of functions in it, but any function that potentially uses memory allocator of the Bootloader may have bad side effect on the runOS image because the current memory allocator does not sense the presence of the OS image and uses memory as much as possible if needed A pointer to a Bldr_Anchor structure is located right after a Phal_SimpleDownLoadAPIpointers structure as follows typedef struct Phal_ExAPIpointers{
Phal_SimpleDownLoadAPIpointers std;
Ui32 anchor;
Phal_ExAPIpointers;Where, anchor holds a pointer to a Bldr_Anchor structure and allows the runimage to locate the structure as seen in the following example. Bldr_Ahcor*panchor=)bldr_Anchor*) (((Phal_ExAPIpointers*) 0x80000800) PAnchor=foo;

9 Compressed OS download

The OS image is compressed, and downloaded in the FlashROM. During system booting the compressed OS is unzipped by unzip utility, and loaded in the DRAM memory for execution.

9.1 Compression

The original OS image consists of ROM Info Block and Power TV OS, and is compressed by free GNU gzip.exe (version 1.2.4) utility during build process.

The compressed image consists of gzip header (15 bytes) starting with magic number (0x1f8b), compressed data, CRC32 check sum (4 bytes), and the size of the original data (4 bytes).

9.2 PrepareForZip

PrepareForZip prepares the compressed OS for the Bootloader to execute unzip operation at system booting. First it makes the compressed OS image acceptable by DNCS by adding a Dummy ROM Info Block. And it adds another block of data called Pioneer Header that contains information about unzip operation for the Bootloader. Finally it appends unzip executable binary. The output image of the PrepareForZip consists of the following blocks of layer in order.

Dummy ROM Info Block
Pioneer Header
Unzip executable
Compressed OS

Prepare,ForZip utility program expects three input files, the original OS binary image file (ptvrom.bin), unzip utility file (punzip.bin) and compressed OS binary file (ptvrom.gz). Also it needs the start address of the compressed image downloaded in the FlashROM and the destination address of the unzipped OS in the DRAM memory.

The Dummy ROM Info Block contains a copy of the original ROM Info Block with three elements modified, the Start Address, ImageLength and CRC. The new StartAddress points to the beginning of the Pioneer Header, which contains the address of the unzip function. The ImageLength and CRC are updated for the newly created output image.

The Pioneer Header contains information regarding unzip operation for the Bootloader After checking integrity of the compressed OS image in the FlashROM, the Bootloader executes the unzip operation by jumping to the address stored in the Pioneer Header.

The Pioneer Header consists of the following data structure.

typedef struct PIONEER_HEADER {
unsigned int unzipFuncPtr;
unsigned int unzipFrom;
unsigned int unzipTo;
unsigned int unzipLength;
unsigned int flag;
char marker[8];
unsigned int reserved0
unsigned int reserved1 [8];
}PIONEER_HEADER;

The unzipFuncPtr contains the address of the unzip function. The unzipFrom contains the start address of the compressed OS image in the FlashROM to be unzipped. The unzipTo contains the destination address for the unzipped OS to reside in the DRAM memory. The unzipLength is the total size of the compressed OS to be unzipped. The flag indicates whether the FlashROM image is compressed or not. The marker is "ZIPPEDOS", and used by Bootloader for identification of the image. The rest of the reserved space is for future expansion.

The PrepareForZip utility, PrepareForZip.exe, is built by Microsoft Visual C++ environment under c:\projects\utils\prepareforzip directory.

9.3 Unzip utility

The unzip utility, punzip. bin, is developed under c:\projects\voyager3\unzip directory, and built by CYGNUS tools. One thing to note is that unzip function uses last 1 M byte of DRAM space, which is free during system booting, for its data section and heap area. The entry function of the unzip utility is also the function that is called by Bootloader to execute unzip operation. This function takes the arguments from the caller. Those are the address of the compressed OS image in the FlashROM as a source, the address of destination in the DRAM memory for the unzipped image, and the size of the source image. The unzip function returns zero to the caller for success.

The unzip algorithm is adopted from the GNU gzip utility, and modified for our project.

10 Memory Map

The following memory map is described inPMA (Physical MemoryAddress.) To interpret physical address into the program address space, soVMA (Virtual Memory Address), apply the following formulas.

For cached memory space:

VMA=PMA I 0xa0000000

For nonmemory space:

VMA=PMA I 0x80000000

10. 1 FlashROM

Address Description
0x1f000000 Bootloader code space (Write Protected)
Description
(512 KB)
0x1f080000 Storage for OS & Resident Applications
(7.5 MB)

10.2 SDRAM

Address Description
0x00000000 Bootloader code/data space
(512 KB)
0x00080000 OS & Resident Applications
(15.5 MB)

10.3 NVM

The usage of Pioneer NVM space is left to NVM map.xls.ln this chapter, we focus on how to calculate values for CRC fields, such askNvm_HWParamBlk_CRC16 and kNvm_RFMAC_CRC16, and a checksumfieldkNvm_PiHWSerialNumberChecksum.

CRC 16:
CCITT CRC 16, Polynomial $x^{16}+x^{12}+x^5+1$, Seed 0xffff
One's complement of the generated CRC is placed to the CRC field with themost significant byte swapped with the least significant byte as seen below.

define APPEND(pbytes, nbytes)\
{\
unsigned short tmp=\
crc16 (pbytes, nbytes, 0xffff) ^oxffff;\
(pbytes) [(nbytes)+0]=(tmp>>0) & 0xff;\
(pbytes) [(nbytes)+1]=(tm>>8) & 0xff;\
}

Checksum: Retrieved by the following formula.

0xff^byte[0]^byte [1]^byte [2]^byte[n]

11 Appendixes

A. Terminologies
SBL header:
A commonly used name for Phal_SimpledownloadHeader. The file attached with this header is often called SBL file. OS Boot Enabled Flag:

The most significant bit of kBldr_SysFlags stored in NVM. This bit is set to 1 (one) to enable OS. See NVM-map.xls for details of kBldr_SysFlags.CVT:
A short for Code Version Table. See DHCT code download operation and data structure ver.1.10 for details.
CVT record:
Contains download information, such as a frequency at which the OS image is conveyed, that corresponds to a specific type of box
Pioneer Hardware Parameter Block
Read-only parameters stored in NVM, which is initialized at the factory for each box. This block ranges from kNvm_Pi Cookie through kNvm_PiCRC16_Lo (see NVM map.xls).
TEXT
B. Bootloader Versions and Hardware Parameters
Item Description
Bootloader Revision 0.10.nn support the Platform API only
0.60.nn $1^{st}$ SQA release
0.70.nn $2^{nd}$ SQA release
0.80.nn SA certification release
0.90.nn TP release
1.00.nn PP/MP release
Manufacturers ID 0x00e036
Manufacturers Model 1300 (decimal)
Manufacturers Revision 10 (decimal)
Hardware ID 1 (decimal)
C. The Data Structure for Serial Download
typedef struct Phal_SimpleDownLoadHeader
ui32 checksum;
ui32 startAddress;
ui32 datalength;
ui32 reserved;
} Phal_SimpleDownLoadHeader;
Where,
checksum is XOR of all the following fields and the binary data.
startAddress designates the address to place the data into memory.
datalength designates the length of the binary data in bytes. excluding this header.
reserved is reserved for future expansion.
D. The Hunt for the Frequency
Although the Bootloader retrieves CVT from init does not have any means to get a channel allocation map that should describe the valid channel allocations. Hence. it needs to search each possible digital carrier for an available data channel, which we call the hunt for the frequencies. During the hunt for the frequencies, the Bootloader searches each possible digital carrier in the following manner until it gets CVT. The following each step continues next unless the Bootloader successfully gets the tuner locked within 2 seconds and retrieves CVT within the next 3 seconds. Suppose N indicates an EIA channel number:

a. Tune to the Standard QAM frequency corresponds to N with QAM64.
b. Tune to the Standard QAM frequency corresponds to N with QAM256.
c. Tune to the HRC QAM frequency corresponds to N with QAM64.
d. Tune to the HRC QAM frequency corresponds to N with QAM256.
e. Increment N and repeat a) through e). If N reaches to the maximum channel that the tuner can handle, and then it is reset to 2.

QAM64: Symbol Rate 5,0569.00 K symbol/sec
QAM256: Symbol Rate 5,3606.50 K symbol/sec
E. DNCS Versions
DNCS revision 1.4 or later The present invention is not to be limited in scope by the specific embodiments described herein. Indeed, various modifications of the present invention, in addition those described herein, will be apparent to those of skill in the art from the foregoing description and accompanying drawings. Thus, such modifications are intended to fall within the scope of the appended claims.

What is claimed is:

1. An apparatus for efficiently running an execution image containing instructions for running a computer program, comprising:
    a non-volatile memory configured to store a version of said execution Image:
    a volatile memory configured to execute said execution image;
    a decompression code in said non-volatile memory; and
    a computing unit configured to transfer said version of said execution image from said non-volatile memory to said volatile memory wherein said computing unit uses a first and an optional second header, said optional second header indicating whether said version of said execution image is a compressed version, and decompressing said compressed version using said decompression code, if so.

2. The apparatus of claim 1, wherein said non-volatile memory is a FlashROM.

3. The apparatus of claim 1, wherein said volatile memory is a DRAM.

4. A method for efficiently running an execution image containing instructions for running a computer program, comprising the steps of:
    storing a version of said execution image in a non-volatile memory;
    storing a decompression code in said non-volatile memory;
    using a first and an optional second header, said optionl second header indicating whether said version of said execution image is a compressed version; and
    decompressing said compressed version using said decompression code, if indicated by said second header; and
    executing said execution image in said volatile memory.

5. The method of claim 4, wherein said non-volatile memory is a FlashROM.

6. The method of claim 4, wherein said volatile memory is a DRAM.

* * * * *